United States Patent [19]
Sato

[11] Patent Number: 4,477,154
[45] Date of Patent: Oct. 16, 1984

[54] PHOTOGRAPHIC OBJECTIVE
[75] Inventor: Yasuhisa Sato, Kanagawa, Japan
[73] Assignee: Canon Kabushiki Kaisha, Tokyo, Japan
[21] Appl. No.: 387,451
[22] Filed: Jun. 11, 1982
[30] Foreign Application Priority Data
  Jun. 27, 1981 [JP] Japan ................... 56-99862
[51] Int. Cl.³ .................. G02B 9/60; G02B 13/18
[52] U.S. Cl. ..................... 350/432; 350/465
[58] Field of Search .................. 350/432, 465
[56] References Cited
U.S. PATENT DOCUMENTS
  4,368,956  1/1983  Yamada et al. ............ 350/432
  4,373,786  2/1983  Yamada .................. 350/432
  4,394,073  7/1983  Wakamiya ............... 350/465
  4,429,958  2/1984  Yamaguchi ............. 350/465 X

FOREIGN PATENT DOCUMENTS
  95207  8/1981  Japan .................... 350/465

Primary Examiner—John K. Corbin
Assistant Examiner—Scott J. Sugarman
Attorney, Agent, or Firm—Toren, McGeady and Stanger

[57] ABSTRACT

A photographic objective of small size, having five lens elements of which the 1st counting from the front is of positive power and in the meniscus form convex toward the front, the 2nd is of negative power, the 3rd is of positive power and turns its convex rear surface toward the rear, the 4th is of positive power and the 5th is of negative power and in the meniscus form convex toward the rear. Numerical limits are given to certain design features of these five lens elements so that good correction of aberrations is attained.

2 Claims, 13 Drawing Figures

SPHERICAL ABERRATION (mm)

ASTIGMATISM (mm)

DISTORTION (%)

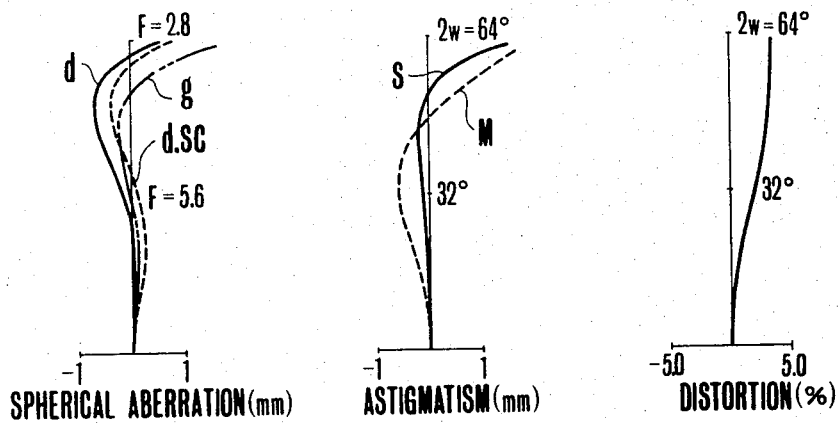
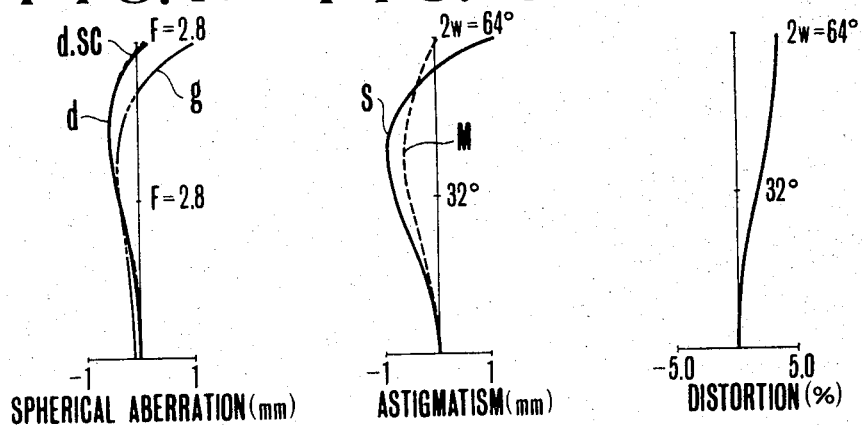
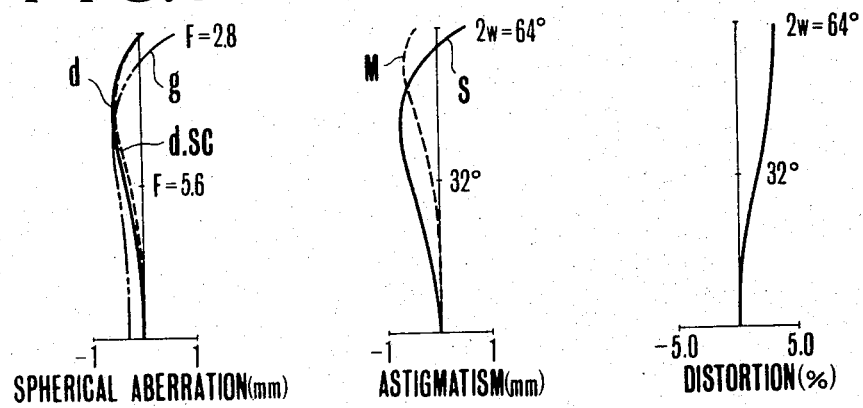

PHOTOGRAPHIC OBJECTIVE

BACKGROUND OF THE INVENTION

1. Field of the Invention

This invention relates to photographic objectives of small size having a reduced number of constituent lenses with the total length of the lens system being shortened to suit for wide angle shooting.

2. Description of the Prior Art

Recently, as the trend of cameras in minimization of their bulk and size advances, there are increasing demands for small-sized photographic objectives with a shortening of the total length of the lens system. Particularly in respect to the ratio of the total length L of the lens system measured from the front vertex to the focal plane to the focal length f, or the so-called telephoto ratio L/f, it is desired that its value is taken at less than unity. For this purpose, it is preferred to construct the lens system from a front lens group of positive power and a rear lens group of negative power. Such power distribution has found its many used in photographic objectives for long focal length with narrow angular field coverage which are of the so-called telephoto type, but there are a few examples of acceptance in objectives of wider angular field coverage than the standard one. This is because the shortening of the total length of the lens system under the condition of this power distribution causes distortion, field curvature, astigmatic difference and coma to increase as the image angle increases. As such objective, though being few in number, mention can be made of several ones. For example, in Japanese Patent No. Sho 44-10831, an objective having an image angle on the order of those of the standard ones is described. Also U.S. Pat. No. 3,998,527 discloses an objective of which the total length is shortened though it is somewhat slow as the F-number is 4.5, while U.S. Pat. Nos. 4,235,521 and 4,303,313 providing objectives of increased image angle while still preserving fast F-numbers, though the total length is somewhat elongated as the telephoto ratio is nearly unity.

SUMMARY OF THE INVENTION

It is an object of the present invention to provide a photographic objective of small size having a wide angular field coverage with a high relative aperture and a shortened total length of the lens system.

One of the features of the present invention is the form and arrangement and construction of the lens elements which constitute the photographic objective in such a way that, in order from the front, the 1st lens element I has a positive refractive power and is formed to a meniscus shape of convex curvature toward the front, the 2nd lens element II has a negative refractive power, the 3rd lens element III has a positive refractive power with its rear surface convex toward the rear, the 4th lens element IV has a positive refractive power and the 5th lens element V has a negative refractive power and is formed to a meniscus shape of rearward convexity. Proper numerical ranges are given for certain features of these five lens elements to accomplish the object of the present invention.

DETAILED DESCRIPTION OF THE PREFERRED EMBODIMENTS

Figure 1:
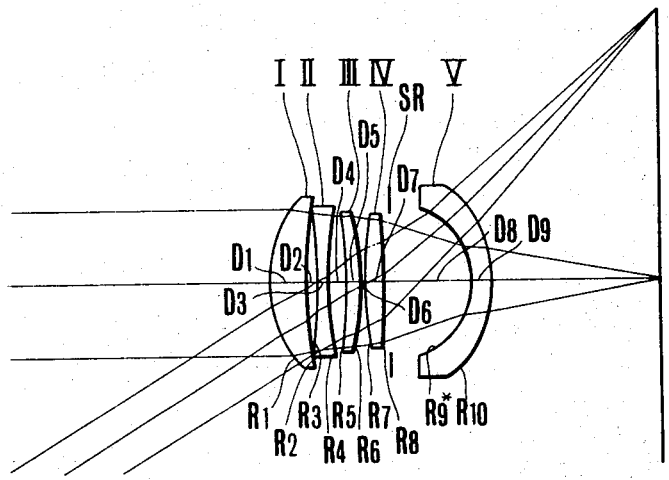
FIG. 1 is a longitudinal sectional view of a photographic objective according to the present invention.
Figure 2A:
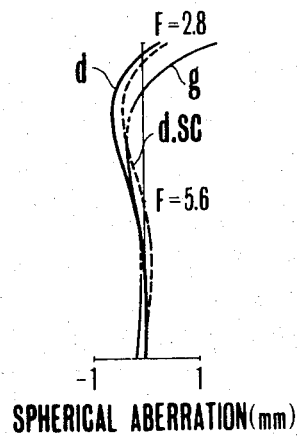
FIG. 2-a to -c, to FIGS. 5-a to -c are graphic representations of the various aberrations of Examples 1 to 4 of specific objectives of the invention respectively.
Figure 2B:
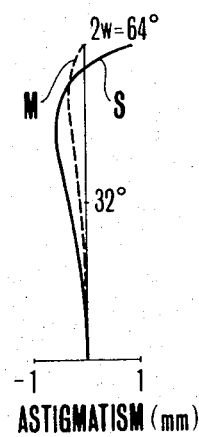
Figure 2C:
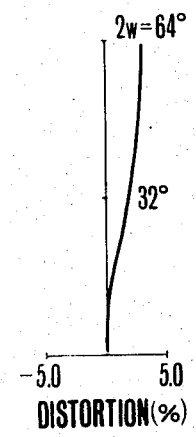

In FIG. 1 there is shown the general embodiment of the objective according to the present invention comprising, from front to rear, a positive meniscus 1st lens element I of forward convexity, a negative 2nd lens element II, a positive 3rd lens element III with its rear surface convex toward the rear, a positive 4th lens element IV and a negative meniscus 5th lens element of rearward convexity. A stop is indicated at SR. And, letting $f_F$ denote the overall focal length of the 1st to 4th lens element I to IV, f the focal length of the entire lens system, r5 and r6 the radii of curvature of the front and rear surfaces of the 3rd lens element III respectively, and n3 and n4 the indices of refraction of the glasses from which the 3rd and 4th lens elements are made up, the following conditions are set forth.

$$0.4 < f_F/f < 0.9 \tag{1}$$

$$3 < (r5 + r6)/(r5 - r6) < 9 \tag{2}$$

$$1.55 < (n3 + n4)/2 < 1.75 \tag{3}$$

As has been stated above, in the telephoto type objective lens with which the present invention concerns, as the total length of the lens system is shortened, the Petzval sum tends to increase in the negative sense with increase in field curvature and astigmatism. Positive distortion is also increased and coma too is deteriorated badly. On this account, to make a good compromise between the requirements of shortening the total length of the lens system and of achieving good correction of the various aberrations, numerical ranges for the design factors are defined in inequalities (1) to (3), each of which is explained below successively.

Inequality (1) represents a condition related to a valuable reduction in the total length of the lens system and defines a range for the positive refractive power of the front assembly comprised of the 1st to 4th lens elements. To realize the telephoto ratio of the objective at 0.9, it is essential that this front assembly has a strong positive refractive power. However, impartment of an excessively strong refractive power thereto leads to make it difficult to well correct aberrations. When the focal length $f_F$ of the aforesaid front assembly of positive power exceeds the upper limit of the range (1), the resulting refractive power is too weak to achieve the reduction of the total length of the lens system. When the lower limit is exceeded, as the refractive power is very strengthened, the positive distortion and that part of the astigmatic difference which lie in the middle zone of the picture format have despite the fulfilment of the aforesaid lens configuration and the other various numerical conditions to objectionably increases, thus making it difficult to perform good correction of aberrations.

Inequality (2) concerns with correction of coma in the middle zone of the picture format which depends upon the radii of curvature of the surfaces of the 3rd lens element III. When the upper limit is exceeded, outward coma is produced and the astigmatic difference is increased. When the lower limit is exceeded, poor correction of inward coma results, and the field curvature in the middle zone of the picture format is increased. In any case, violation of inequality (2) leads to lower the resolving power of the objective.

Inequality (3) represents the sum of the refractive indices n3 and n4 of the glasses of the 3rd and 4th lens elements III and IV which affect spherical aberration and curvature of field. As has been stated above, the shortening of the total length of the lens system causes the Petzval sum of the entire system to increase in the negative sense with the result of overcorrection of field curvature. To correct this, the Petzval sum must be maintained at an appropriate value either by lowering the refractive index of the positive lens, or by heightening the refractive index of the negative lens. However, when the refractive index of the positive lens is too lowered, deterioration of the spherical aberration will be involved. In the present invention, this adjustment is formed by using the 3rd and 4th elements III and IV having the refractive indices n3 and n4. That is, when the upper limit of inequality (3) is exceeded, though being advantageous at good correction of spherical aberration, this results in over-correction of field curvature which contributes to some loss in the imagery in the middle zone of the picture format. When the lower limit is exceeded, zonal spherical aberration is increased, contributing to some loss in the imagery near the central zone of the picture format.

Though the object of the present invention can be accomplished by satisfying the foregoing various conditions, a further improvement of the aberration correction can be facilitated by configuring the front surface r9 of the 5th lens element V to an aspheric form under the following condition.

An equation for the front or aspheric surface of the 5th lens element may be expressed by the difference $\Delta X$ between this aspheric surface and a spherical surface which is assumed to have a radius of curvature, r9, contributable to the determination of the focal length (hereinafter referred to as "paraxial radius of curvature") in parallel to the optical axis as x-axis with the direction perpendicular to the optical axis as y-axis and by taking the direction in which light advances as positive with the intersection of the aspheric surface and the x-axis as the original point as follows:

$$\Delta X = \{(1/r^*_9)y^2\}/\{1+\sqrt{1-(y/r^*_9)^2}\} + a_1 y^2$$
$$+ a_2 y^4 + a_3 y^6 + \ldots + b_1 y^3 + b_2 y^5 + \ldots$$
$$- \{(1/r_9)y^2\}/\{1+\sqrt{1-(y/r_9)^2}\}$$

where r9 is the radius of curvature of the paraxial region of the front lens surface of the 5th lens element, r9* is the radius of curvature of the spherical reference surface defined by $r9 = 1/[(1/r9^*) + 2a_1]$, and ai and bi are the aspheric coefficients of even- and odd-numbered order respectively.

For the values of $\Delta X$ at the heights of $(r9) \times 0.7$ and $(r9) \times 0.5$ in the y-ordinate which values are expressed by $\Delta X[0.7r9]$ and $\Delta X[0.5r9]$ respectively, the following conditions are set forth:

$$5 \times 10^{-4} < |\Delta X[0.7\, r_9]/f| < 5 \times 10^{-3} \quad (5)$$

$$5 \times 10^{-5} < |\Delta X[0.5\, r_9]/f| < 1 \times 10^{-3} \quad (6)$$

As has been stated above, the use of telephoto type having the negative lens arranged in the rear of the lens system as in the present invention gives rise to a problem of increasing the Petzval sum in the negative sense as the total length of the lens system is made smaller and also producing large positive distortion. Particularly the distortion amounts up to 5% or more and is very harmful. The aspheric form of the fron lens surface of the 5th lens element plays an important role in controlling particularly distortion. Inequalities (5) and (6) while laying great emphasis on this correction of distortion are to well correct the other various aberrations such as field curvature and coma.

Inequality (5) is related to the image quality particularly in the marginal zone of the picture format. When the lower limit is exceeded, over-correction sagittal image surface will result, and inward coma will be also produced. When the upper limit is exceeded, extraordinarily large positive distortion is produced and it becomes difficult to obtain an acceptable imaging performance.

Inequality (6) is related to the image quality particularly in the middle zone of the picture format. When the lower limit is exceeded, under-correction of the meridional image surface in the middle zone will result, and astigmatic difference be increased. Strong inward coma will be also produced. When the upper limit is exceeded, under-correction of spherical aberration will result, and halo will appear in the middle zone.

Thus, the introduction of the aspheric surface based on the inequalities (5) and (6) enables the lens system to be corrected for a higher grade imagery.

Four Examples 1 to 4 of specific objectives of FIG. 1 can be constructed in accordance with the numerical data given in the following tables for the radii of curvature, R, the axial thicknesses and air separations, D, and the refractive indices N for the spectral d-line and the Abbe numbers, $\nu$, of the glasses of the lens elements, which are all expressed with the subscripts numbered consecutively from front to rear. It is to be noted in this connection that Example 3 represents a lens system with the exclusion of the aspheric surface, and that fR denotes the focal length of the 4th lens element IV.

EXAMPLE 1

| F = 100. | FNo = 1:2.8 | $2\omega = 64°$ | | |
|---|---|---|---|---|
| $R_1 =$ 28.75 | $D_1 =$ 8.51 | $N_1 = 1.67790$ | $\nu_1 = 55.3$ | |
| $R_2 =$ 101.73 | $D_2 =$ 2.72 | | | |
| $R_3 =$ −117.24 | $D_3 =$ 2.90 | $N_2 = 1.84666$ | $\nu_2 = 23.9$ | |
| $R_4 =$ 80.06 | $D_4 =$ 4.40 | | | |
| $R_5 =$ −84.22 | $D_5 =$ 3.71 | $N_3 = 1.59270$ | $\nu_3 = 35.3$ | |
| $R_6 =$ −54.55 | $D_6 =$ 0.53 | | | |
| $R_7 =$ 78.83 | $D_7 =$ 5.14 | $N_4 = 1.59270$ | $\nu_4 = 35.3$ | |
| $R_8 =$ −157.09 | $D_8 =$ 22.13 | | | |
| $R_9^* =$ −19.05 | $D_9 =$ 3.48 | $N_5 = 1.49171$ | $\nu_5 = 57.4$ | |
| $R_{10} =$ −28.92 | | | | |

Aspheric Coefficient $a_1 = -2.990 \times 10^{-3}$   $b_1 = -5.700 \times 10^{-5}$   $f_F/f = 0.660$
$a_2 = -3.650 \times 10^{-6}$   $b_2 = 1.829 \times 10^{-6}$   $f_R/f = -0.943$
$a_3 = -1.597 \times 10^{-7}$   $b_3 = -1.088 \times 10^{-8}$   $D_8/f = 0.2213$
$a_4 = 2.147 \times 10^{-9}$   $b_4 = -1.075 \times 10^{-10}$   $R_9/f = -0.171$
$a_5 = 1.752 \times 10^{-12}$ Paraxial $R_9 = 1/\{(1/R_9^*) + 2a_1\}$
$= -17.1048$ $|\Delta X[0.7r_9]/f|$
$= 1.21 \times 10^{-3}$
$|\Delta X[0.5r_9]/f|$
$= 1.24 \times 10^{-4}$ $R_9^*$: Aspheric Surface

EXAMPLE 2

| F = 100. | FNo = 1:2.8 | 2ω = 64° | | |
|---|---|---|---|---|
| $R_1 = 26.47$ | $D_1 = 8.45$ | $N_1 = 1.62041$ | $\nu_1 = 60.3$ | |
| $R_2 = 109.35$ | $D_2 = 2.60$ | | | |
| $R_3 = -96.57$ | $D_3 = 2.32$ | $N_2 = 1.84666$ | $\nu_2 = 23.9$ | |
| $R_4 = 94.32$ | $D_4 = 4.41$ | | | |
| $R_5 = -71.61$ | $D_5 = 3.52$ | $N_3 = 1.64769$ | $\nu_3 = 33.8$ | |
| $R_6 = -52.77$ | $D_6 = 0.42$ | | | |
| $R_7 = 84.60$ | $D_7 = 5.23$ | $N_4 = 1.59270$ | $\nu_4 = 35.3$ | |
| $R_8 = -105.52$ | $D_8 = 20.25$ | | | |
| $R_9^* = -18.18$ | $D_9 = 3.48$ | $N_5 = 1.49171$ | $\nu_5 = 57.4$ | |
| $R_{10} = -30.98$ | | | | |

Aspheric Coefficient $a_1 = -3.591 \times 10^{-3}$  $b_1 = -9.735 \times 10^{-5}$  $f_F/f = 0.608$
$a_2 = 7.874 \times 10^{-7}$  $b_2 = 1.701 \times 10^{-6}$  $f_R/f = -0.737$
$a_3 = -1.641 \times 10^{-7}$  $b_3 = -1.090 \times 10^{-8}$  $D_8/f = 0.2025$
$a_4 = 2.150 \times 10^{-9}$  $b_4 = -1.074 \times 10^{-10}$  $R_9/f = -0.1608$
$a_5 = 1.746 \times 10^{-12}$ Paraxial $R_9 = -16.0825$ $|\Delta X[0.7r_9]/f| = 1.34 \times 10^{-3}$ $|\Delta X[0.5r_9]/f| = 1.4 \times 10^{-4}$ $R_9^*$: Aspheric Surface

EXAMPLE 3

| F = 100. | FNo = 1:2.8 | 2ω = 64° | | |
|---|---|---|---|---|
| $R_1 = 31.80$ | $D_1 = 8.69$ | $N_1 = 1.77250$ | $\nu_1 = 49.6$ | |
| $R_2 = 94.59$ | $D_2 = 4.30$ | | | |
| $R_3 = -101.86$ | $D_3 = 2.90$ | $N_2 = 1.84666$ | $\nu_2 = 23.9$ | |
| $R_4 = 53.91$ | $D_4 = 3.57$ | | | |
| $R_5 = -83.00$ | $D_5 = 3.27$ | $N_3 = 1.59270$ | $\nu_3 = 35.3$ | |
| $R_6 = -66.80$ | $D_6 = 0.43$ | | | |
| $R_7 = 58.27$ | $D_7 = 6.58$ | $N_4 = 1.59270$ | $\nu_4 = 35.3$ | |
| $R_8 = -67.06$ | $D_8 = 22.35$ | | | |
| $R_9 = -21.09$ | $D_9 = 3.48$ | $N_5 = 1.49171$ | $\nu_5 = 57.4$ | |
| $R_{10} = -37.00$ | | | | |

$f_F/f = 0.681$
$f_R/f = -1.075$
$D_8/f = 0.2235$
$R_9/f = -0.2109$

EXAMPLE 4

| F = 100. | FNo = 1:2.8 | 2ω = 64° | | |
|---|---|---|---|---|
| $R_1 = 32.66$ | $D_1 = 8.42$ | $N_1 = 1.77250$ | $\nu_1 = 49.6$ | |
| $R_2 = 112.55$ | $D_2 = 2.84$ | | | |
| $R_3 = -157.53$ | $D_3 = 2.90$ | $N_2 = 1.84666$ | $\nu_2 = 23.9$ | |
| $R_4 = 69.22$ | $D_4 = 4.58$ | | | |
| $R_5 = -98.00$ | $D_5 = 4.38$ | $N_3 = 1.66446$ | $\nu_3 = 35.7$ | |
| $R_6 = -63.93$ | $D_6 = 0.43$ | | | |
| $R_7 = 120.89$ | $D_7 = 5.49$ | $N_4 = 1.74950$ | $\nu_4 = 35.3$ | |
| $R_8 = -231.37$ | $D_8 = 25.83$ | | | |
| $R_9^* = -19.58$ | $D_9 = 3.48$ | $N_5 = 1.49171$ | $\nu_5 = 57.4$ | |
| $R_{10} = -25.83$ | | | | |

Aspheric Coefficient $a_1 = -2.232 \times 10^{-3}$  $b_1 = -5.335 \times 10^{-6}$  $f_F/f = 0.737$
$a_2 = -9.172 \times 10^{-6}$  $b_2 = 2.153 \times 10^{-6}$  $f_R/f = -1.417$
$a_3 = -1.582 \times 10^{-7}$  $b_3 = -1.114 \times 10^{-8}$  $D_8/f = 0.258$
$a_4 = 2.135 \times 10^{-9}$  $b_4 = -1.074 \times 10^{-10}$  $R_9/f = -0.1801$
$a_5 = 1.820 \times 10^{-12}$ Paraxial $R_9 = -18.0097$ $|\Delta X[0.7r_9]/f| = 1.23 \times 10^{-3}$ $|\Delta X[0.5r_9]/f| = 2.09 \times 10^{-4}$ $R_9^*$: Aspheric Surface It will be appreciated from the above-described specific embodiments that a photographic objective having a wider image angle of 64° with a higher relative aperture of 2.8 in F-number and, in the case of the shortest total length, a telephoto ration of 0.93 than was heretofore possible, is realized by using a reduced number of constituent lens elements.

The focusing method usuable in the foregoing embodiment may be either by axially moving the entire lens system, or so-called bodily focusing as a matter of course, or by imparting independent movement into a unit of the 1st to 4th lens elements I to IV, or so-called front member focusing as well. In either case, it is possible to maintain good stability of aberration correction throughout the entire focusing range of from a close distance equal to 25 times the focal length to infinity.

It is also to be noted that the 5th lens element may be made up of synthetic resin by molding means not only for economic reasons but also from the standpoint of severe tolerances.

As has been described in greater detail above, the rules of design of the type of photographic objective of the invention enable those of the aberrations which would be otherwise deteriorated badly when the total length is made shortened, for example, distortion, field curvature, astigmatic difference and coma, to be well corrected for high grade imaging performance.

What is claimed is:

1. A photographic objective having the following various conditions:

having five lens components, in order from front to rear, the 1st lens components being a meniscus lens of positive refractive power convex toward the front, the 2nd lens component being a lens having a negative refractive power, the 3rd lens component being a meniscus lens of positive refractive power convex toward the rear, the 4th lens component being a lens having a positive refractive power, and the 5th lens component being a meniscus lens of negative refractive power convex toward the rear, said objective satisfying the following conditions:

$0.4 < f_F/f < 0.9$ $3 < (r_5 + r_6) / (r_5 - r_6) < 9$ $1.55 < (n_3 + n_4) / 2 < 1.75$ wherein $f_F$: the overall focal length of said 1st to said 4th lens components, $f$: the focal length of the entire lens system, $r_5$ and $r_6$: the radii of curvature of the front and rear lens surfaces of said 3rd lens component respectively, and $n_3$ and $n_4$: the refractive indices of the glasses of the said 3rd and said 4th lens components respectively.

2. A photographic objective according to claim 1, wherein the front lens surface of said 5th lens component is formed to an aspheric one, and letting $\Delta X$ denote the difference between this aspheric surface and a spherical surface of which the radius of curvature, r9, is contributable to the determination of the focal length, and taking the axial direction as an x-axis, the direction perpendicular to the optical axis as a y-axis, the direction in which the light advances as positive with the intersection of the aspheric surface and the optical axis as an original point, we have $\Delta X$ $$\Delta X = \{(1/r^*_9)y^2\}/\{1 + \sqrt{1 - (y/r^*_9)^2}\} + ay^2$$

$$+a_2y^4+a_3y^6+\ldots+b_1b^3+b_2y^5+\ldots$$
$$-\{(1/r_9)y^2\}/\{1+\sqrt{1-(y/r_9)^2}\}$$

where r9 is the radius of curvature of the paraxial region of the front surface of the 5th lens component, r9* is the radius of curvature of the reference sphericl surface of the equivalent lens component defined by r9=1/[(1/r9*)+2a1], ai and bi are the aspheric coefficients of even- and odd-numbered orders respectively, and for the values of $\Delta X$ at the heights of $(r9) \times 0.7$ and $(r9) \times 0.5$ in the y-ordinate which values are denoted by $\Delta X[0.7r9]$ and $\Delta X[0.5r9]$ respectively, the following conditions are set forth:

$$5 \times 10^{-4} < |\Delta X[0.7r9]/f| < 5 \times 10^{-3}$$

$$5 \times 10^{-5} < |\Delta X[0.5r9]/f| < 1 \times 10^{-3}$$

* * * * *